Nov. 5, 1929.  C. R. RANEY  1,734,401
WINDOW HARVESTER
Filed Aug. 13, 1928  2 Sheets-Sheet 1
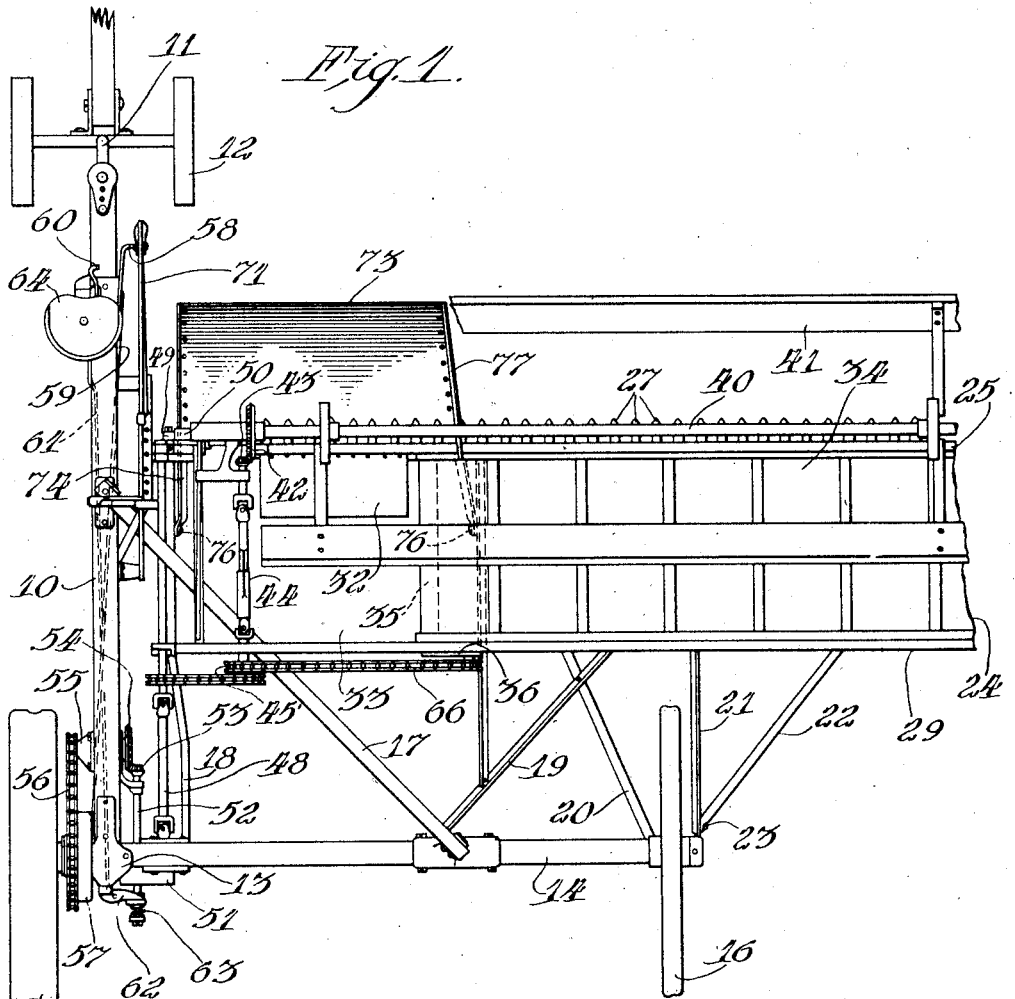
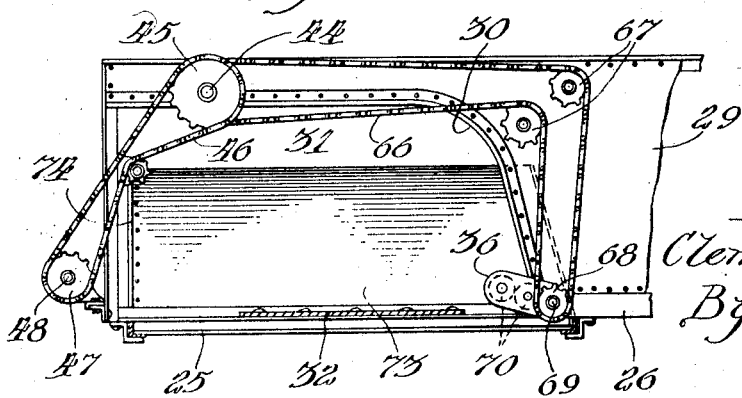
Inventor.
Clemma R. Raney.

Nov. 5, 1929.  C. R. RANEY  1,734,401
WINDOW HARVESTER
Filed Aug. 13, 1928   2 Sheets-Sheet 2
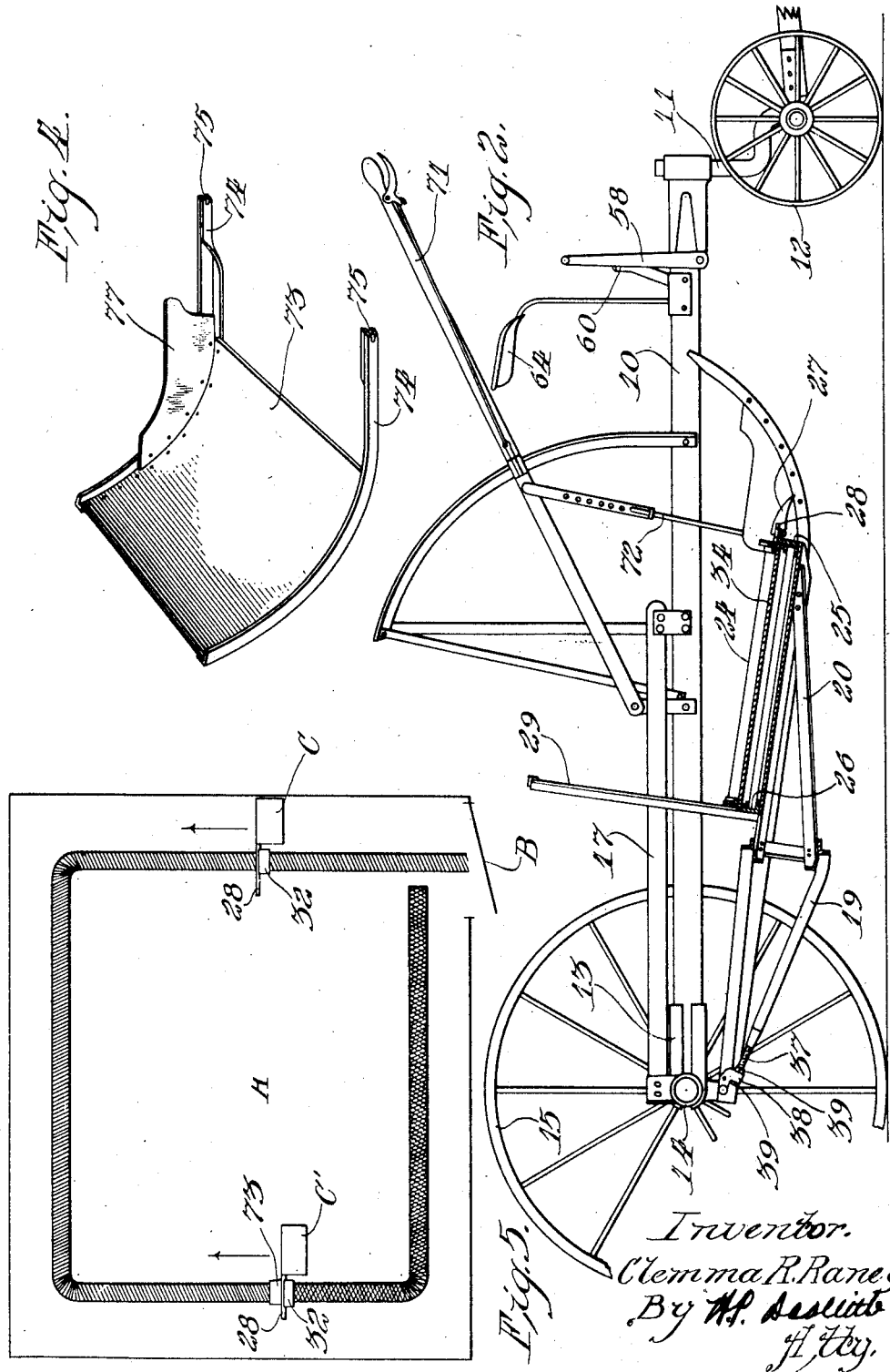

Patented Nov. 5, 1929

1,734,401

UNITED STATES PATENT OFFICE

CLEMMA R. RANEY, OF RIVERSIDE, ILLINOIS, ASSIGNOR TO INTERNATIONAL HARVESTER COMPANY, A CORPORATION OF NEW JERSEY

WINDROW HARVESTER

Application filed August 13, 1928. Serial No. 299,374.

The invention relates to an improvement in windrow harvesters.

Particularly it relates to a device to be associated with a particular kind of windrow harvester which will expedite and make easy the operation of opening up a field.

Windrow harvesters are now commonly utilized in the harvesting of grain. These machines cut the grain, and form the same into windrows in which formation the grain will evenly dry. Green weeds will also dry out. This windrowing operation is preliminary to the use of a combination harvester thresher. When the grain is ready, it is picked up by means of a pick-up attachment associated with the harvester thresher. The grain is thus gathered from the windrow and delivered into the harvester thresher for threshing as is usual when employing threshers.

In the particular form of windrow harvester herein to be disclosed the grain cut thereby is discharged along a portion of a cutter bar and rearwardly thereof, so that, when in opening up a field it is never necessary or possible to form the windrow on any uncut grain standing in the field. When opening up a field, the harvester first takes the back swath, which is that swath along the outer edge of the field and usually adjacent a fence. In cutting this back swath, the harvester is moved in a counter-clockwise direction, thus forming a windrow spaced as far as possible away from the fence. After the back swath has been formed into a windrow, the harvester is made to move in a clockwise direction around the field, which causes the harvester to deposit the first swath after the back swath into windrow formation on top of the back swath windrow.

As this is piling up the windrow quite high, the cutter bar of the harvester is not liable to clear the back swath windrow without scattering the same. Naturally, therefore, it is highly desirable that some form of an attachment or means be associated with the windrow harvester on its first clockwise trip around the field to depress or compress the back swath windrow so that it will not cause the cutter bar of the harvester to scatter the grain in the windrow already lying in the field.

The invention, therefore, specifically relates to a quickly detachable compressor attachment for use on a windrow harvester in advance of the cutter bar thereof to compress the back swath windrow to enable the cutter bar to pass over this windrow, so that a second windrow may be deposited thereon.

The objects of the invention are to provide an improved windrow harvester; to provide an attachment for compressing the back swath windrow as the first regular windrow is being deposited thereon, as has been described; to provide such an attachment which is quickly detachable and attachable; to provide such an attachment which includes an inside divider; and, lastly, generally to improve and enhance the operation of windrow harvesters with the thought of simplifying the operation of opening up a field.

These desirable objects are briefly accomplished in a windrow harvester that deposits a windrow into the field at a point of discharge located rearwardly of a cutter bar, there being arranged in advance of the cutter bar a curved deflector member which serves to compress a back swath windrow already formed so that a second windrow may be laid on top of the first windrow, all as will later more fully appear in the detailed description.

Referring to the accompanying sheets of drawings wherein a practical embodiment of the invention is illustrated—

Figure 1 is a general top plan view of a windrow harvester provided with the device of this invention, the outer or grainward end of the machine being partly broken away;

Figure 2 is a general side elevational view of the windrow harvester showing a section through the platform clearly to illustrate the compressor attachment;

Figure 3 is a rear elevational view of the discharge end of the header platform;

Figure 4 is a detached detail perspective view of the compressor per se; and

Figure 5 is a diagram view of a field illustrating the operation and use of the improved windrow harvester, especially when opening up a field.

The main frame of the machine comprises a single longitudinal pipe frame member 10 supported at its front end on the spindle 11 of a steering pilot wheel truck 12. In some cases it may be desirable to eliminate this wheel truck and to connect the frame member 10 directly to the drawbar of a tractor. Extending right angularly from the member 10 at its rear end in a grainward direction, and secured to the member 10 by a bracket 13, is a transverse pipe frame support 14 on which is mounted at its stubbleward end, a main wheel 15, and at its grainward end, a grain wheel 16. A diagonal brace 17 connected to the members 10 and 14 serves as a cross brace to strengthen the frame. So much as has been described constitutes the main frame of the machine, which, it will be seen, its very simple and strong.

Connected to the under side of the transverse frame pipe 14 at its stubbleward end is a forwardly extending, pivotally mounted arm 18; and grainwardly of the member 18 are two crossed, similarly pivotally mounted diagonal and forwardly extending trussed arms 19 and 20. At the grainward side of the wheel 16 is another forwardly extending, pivotally mounted arm 21 to which the forward end of the truss arm 19 is connected. Extending diagonally forwardly and in a grainward direction is another support arm 22 connected at 23 on the arm 21. These arms 18, 19, 20, 21 and 22 carry at their forward ends a harvester platform 24, which at its front end includes the usual Z-bar 25, and, at its back end, the usual angle bar 26. Connected to the forward end of the Z-bar are the guard fingers 27 and the cutting mechanism 28 of the harvester.

The back end of the platform is provided with the usual upright wind board 29, which at its stubbleward end is formed with an arch 30 to leave an arched passage-way or opening 31 at the stubbleward end of the platform. It is to be understood that the angle bar 26 stops where this arch begins so as to leave an unobstructed opening 31 just described, so that the grain discharged from the conveyor may readily turn into the windrow in formation unimpeded by any obstruction, and also to allow for passage of the machine over the windrow as will be clear. The front end of this opening is provided with a rearwardly and downwardly sloped board 32 which extends from the Z-bar 25, which carries the board, rearwardly of the cutting mechanism and back a short distance into an opening 33 at the stubbleward end of the platform. This opening 33 is substantially in line with the passage-way 31 in the backboard 29. The platform 24 carries a conventional form of conveyor apron 34, which is designed to run stubblewardly to discharge the butt ends of its contents when in operation onto the sloped board 32, for a purpose later to be made clear. This conveyor 34 includes at its stubbleward or discharge end a conventional roller 35 which is carried in the end of a gear box 36 extended upwardly and stubblewardly beyond the edge of the arch 30 and into the passage-way 31, for a purpose later to appear.

As seen in Figure 2, the lower branch of the truss arm 19 has its rear end formed into a threaded shank 37 passed through an eye 38 with nuts 39 on each side of the eye 38, so that, in an obvious manner, by adjusting these nuts, it is possible to take up on the truss arm 19 for the purpose of springing up the platform to adjust the same, to hold it securely, and to some extent prevent whipping thereof when the machine travels over the field, thus materially reducing vibration.

The platform in any conventional manner carries a reel shaft 40 on which is carried a reel 41, the stubbleward end of the reel shaft carrying a bevel gear 42 driven from a bevel pinion 43 on a telescopic longitudinal shaft 44 mounted in the backboard, as shown in Figure 3, at its rear end, where it carries a sprocket wheel 45 driven from a sprocket chain 46 deriving its rotation from a sprocket wheel 47 on a longitudinal shaft 48. This shaft 48 at its front end carries a crank 49 connected to a pitman 50 for reciprocating the cutting mechanism 28 in the usual manner. The rear end of the shaft 48 extends into a gear box 51 in which are gears, (not shown), connected to a forwardly extending counter-shaft 52 operated from a bevel pinion 53 geared to a bevel gear 54 carried on a shaft (not shown) in a bracket 55 supported on the under side of the frame member 10. This shaft (not shown) is driven by chain and gear connections 56 in any conventional manner from the main wheel 15.

A brake drum 57 is also shown for braking machine by means of a brake lever 58 connected by a link 59 to the brake mechanism in the drum 57, as indicated. A clutch lever is shown at 60 at the front end of the frame member 10 and it has a link connection 61 to a clutch control rock arm 62 for controlling a clutch (not shown) in the gear box 51, there being a spring 63 for normally holding the clutch in its driving position, as is common in this art. An operator's seat is arranged at 64 on the front end of the frame 10 accessible to these controls.

The conveyor apron 34 is driven from the shaft 44 by means of a sprocket wheel 45' on the shaft 44 and a chain 66 which is trained around idler sprockets 67 and also a driving sprocket 68 on a shaft 69, which shaft 69 operates a gear train 70 indicated in dotted lines to impart proper direction of rotation to the roller 35, as will be understood. The grainward end of this apron is trained around an idler roller in the usual manner, which is not shown.

A lever 71 is arranged adjacent the seat of the operator and has a connection 72 to the front stubbleward corner of the platform for enabling the operator to raise or lower the platform to accommodate the cutting apparatus to varying heights of grain, as is usual in this art. As the platform is heavy, it is usual to provide a counter-balance mechanism to assist the operator in moving the lever 71. Such means is conventional, and it will, therefore, not be shown or described.

In the use of this harvester, the fenced in field A will be entered through a gate B for example, as shown in Figure 5, the machine first taking the back swath along the fence by traveling in a counter-clockwise direction indicated by the arrow adjacent the machine, diagrammatically shown at C. The reel and cutting mechanism gather the grain, causing it to fall on the conveyor 34 with the head ends at the back and the butt ends at the front, as is usual. The head ends lag slightly in their movement with the conveyor 34 because the butts adjacent the cutting mechanism are first moved by the conveyor as the butts are engaged by the conveyor an instant before the head ends have fallen far enough to be moved by the conveyor, thus causing the butt ends to be presented first to the board 32 in the opening 33 into which the grain is discharged by the conveyor. The board is disposed rearwardly of the cutting mechanism adjacent the point of discharge of the grain from the conveyor and between the standing field stubble and said point of discharge. Thus, the board will act to stop the force of discharge of the grain from the conveyor and prevent the same from being driven into the stubble and on the ground between the rows thereof. The board also deflects the top of all field stubble in its path down and ahead in the direction of its travel, it acting then to hold the stubble tops bent over while the windrow is being laid thereon. The weight of the windrow will, after the board no longer acts, still hold the stubble tops bent over, thus causing the stubble itself to function as a support for the windrow. This construction is more fully described in the co-pending application of Alexus C. Lindgren and Clemma R. Raney, Serial No. 266,479, filed April 2, 1928. The straws slide off the board 32 and turn to a slight diagonal and transverse position as they are laid in the field. As they slide off the board, the stubble engages the head ends of the straws and in combination with the forward movement of the machine causes the head ends of the straws to be pulled down first and, as a result, a windrow is formed in which the straws are disposed diagonally and transversely on the bent over stubble in the field with the butt ends arranged along one side and the head ends arranged along the other side of the windrow in shingle fashion and above the stubble where they will be best exposed to the ventilating action of the wind and the drying action of the sun. That grain which is cut by the cutting mechanism directly in front of the platform opening 33 merely falls back in a thin shingle formation on top of the windrow being laid.

The discharge end of the conveyor apron 34 is clear of the arch 30 in the backboard to cause the machine to travel over the windrow laid without interfering therewith, and also the windrow being laid in the field cannot be engaged by the chains 46 and 66 because they too are set back out of the way where they cannot catch the straws of the windrow and tangle the same. Thus the grain in coming off the discharge end of the conveyor and turning onto the board 32 and into the field has a clear unimpeded path of turning movement into the windrow in formation.

In this fashion, then, the machine travels all the way around the field A, cutting the back swath and laying it out in the improved windrow described.

The machine is now turned around to cause it to travel in a clockwise direction around the field where, in its first swath cut, it takes that standing grain just inside of the windrow formed when the back swath was cut. The machine is now shown at C' in Figure 5 and, as the grain is delivered stubblewardly, it must be formed in a windrow which of necessity must be deposited upon the windrow resulting from cutting of the back swath. This means that a windrow too high to permit passage of the machine is being formed as the result is in effect to form two windrows in a single path. This invention, therefore, contemplates the provision of a quickly detachable compressor for attachment to the cutter bar of the harvester in advance thereof to compress the back swath windrow, so that the first regular clockwise cut swath may be laid on the back swath without causing the harvester and especially the cutter bar thereof to interfere with the back swath windrow already laid.

Looking to Figure 4, it will be seen that this attachment comprises a forwardly and upwardly curved compressor plate 73 mounted on two forwardly extending and similarly curved arms 74, the rear end of which are notched, as at 75, to receive bolts 76 carried on the platform supporting arms, as shown in Figure 1. Thus, in attaching this compressor member, the same is merely slid in from the front underneath the Z-bar 25 until the notches 75 engage the bolts 76, which are then tightened up with the usual nuts to secure this compressor to the platform in a position extending in a direction to cause the plate 73 to extend forwardly in advance of the cutting mechanism.

This attachment also includes an inside divider 77, and the inner side of the plate 73 and the divider 77 are tapered longitudinally, as shown in Figure 1, so that the divider will properly function.

The attachment has now been placed on the windrow harvester in the manner described and as shown in Figures 1 and 2, and is ready for taking the first clockwise cut. The harvester in Figure 5 is now indicated at C' and is traveling in the direction of the arrow where the plate 73 slides over the back swath windrow to press the same down to permit the cutting apparatus and Z-bar of the platform to pass thereover. At the same time, the first clockwise swath of grain which is being cut by the windrow harvester is being laid by means of the board 32 on top of the back swath windrow rearwardly of the cutting apparatus in accordance with the operation of the machine, as has already been described. Thus, to facilitate proper opening of the field, a double windrow is formed and properly laid in the field without scattering the same, so that the ensuing pick-up operation, when using the harvester thresher, will not be hindered. After the first clockwise swath has been laid on the back swath windrow, the compressor plate 73 is removed by unloosening the bolts 76 and sliding the compressor out forwardly from under the Z-bar pressor to disconnect it from the platform frame supports. The machine is now ready for the regular windrow cutting operation. It is to be understood that the compressor is used only when opening up the field, because it is necessary with this type of machine to deposit a double windrow, as has been described.

What is claimed is:

1. In a windrow harvester, a cutting apparatus, and a windrow compressor in advance of the cutting apparatus.

2. In a windrow harvester, a platform including a cutting apparatus, a windrow compressor arranged in advance of the cutting apparatus, and means for detachably connecting the compressor to the platform.

3. In a windrow harvester, a cutting apparatus, means for receiving the cut grain and discharging it rearwardly of the cutting apparatus, and a windrow compressor in advance of said cutting apparatus.

4. In a windrow harvester, a cutting apparatus, means for receiving and discharging the grain rearwardly of said cutting apparatus, and a forwardly extending and upwardly curved compressor member in advance of the cutting apparatus.

5. In a windrow harvester, a cutting apparatus, means for receiving the cut grain and delivering it rearwardly of the cutting apparatus, a compressor in advance of the cutting apparatus, and an inside divider for the cutting apparatus.

6. In a windrow harvester, cutting mechanism, means for receiving the grain and discharging it rearwardly of the cutting mechanism, and a windrow compressor including an inside divider for the cutting mechanism arranged in advance of said cutting mechanism.

7. In a windrow harvester, cutting apparatus, and a unitary windrow compressor and divider arranged in advance of the cutting apparatus.

8. In a windrow harvester, a frame, a cutting apparatus, means for receiving cut material and discharging it rearwardly of the cutting apparatus, and a unitary compressor and inside divider structure detachably connected to the frame and arranged in advance of the cutting mechanism.

9. In a windrow harvester, a header platform, a conveyor thereon, a cutting apparatus in advance thereof and extending stubblewardly of the conveyor, and a windrow compressor connected to the platform in advance of the cutting apparatus and in advance of the point of discharge of said conveyor.

10. In a windrow harvester, a cutting apparatus, means for receiving cut grain and discharging it at a point to the rear of said cutting apparatus, means at the rear of said cutting apparatus for retarding the discharge of grain from the discharging means, and means in advance of said cutting apparatus for compressing a windrow already formed and onto which the grain being cut it to be laid in a second windrow.

11. In a windrow harvester, a cutting apparatus, receiving and delivery means for laying a windrow in the field rearwardly of the cutting apparatus when the machine is traveling counter-clockwise to cut a back swath, the same means cutting and laying a second windrow on top of the first mentioned windrow when the machine is traveling in a clockwise direction to cut the first swath after the back swath, and means adapted to be associated with the windrow harvester in advance of the cutting apparatus to compress the back swath windrow while the next windrow is being laid thereon.

12. In a window harvester, cutting apparatus, a compressor in advance of the cutting apparatus for compressing a windrow already formed, and means rearwardly of the cutting apparatus for laying a second windrow on top of the windrow already formed and rearwardly of the cutting apparatus.

13. In a windrow harvester, a platform having an opening therein, a cutting apparatus arranged in advance of the opening and along the front of the platform, a conveyor receiving the cut grain and discharging it into said opening, and a windrow compressor on the platform in advance of the cutting apparatus and the platform opening.

14. In a windrow harvester, a platform having a discharge opening, cutting apparatus at the front end of the platform and extending in advance of said opening, a conveyor in back of said cutting apparatus and discharging into said opening, a retarder plate on said platform extending into said opening and rearwardly of the cutting apparatus, and a compressor member carried by said platform ahead of said plate and in advance of the cutting apparatus.

In testimony whereof I affix my signature.

CLEMMA R. RANEY.